US010192180B2

(12) United States Patent
Prabhakara et al.

(10) Patent No.: US 10,192,180 B2
(45) Date of Patent: Jan. 29, 2019

(54) METHOD AND SYSTEM FOR CROWDSOURCING TASKS

(71) Applicant: Conduent Business Sercies, LLC, Dallas, TX (US)

(72) Inventors: Jagadeesh Chandra Bose Rantham Prabhakara, Chittoor (IN); Pallavi Manohar, Thane (IN); Chithralekha Balamurugan, Pondicherry (IN)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 674 days.

(21) Appl. No.: 14/818,710

(22) Filed: Aug. 5, 2015

(65) Prior Publication Data

US 2017/0039505 A1 Feb. 9, 2017

(51) Int. Cl.
*G06Q 10/06* (2012.01)
*G06Q 50/00* (2012.01)

(52) U.S. Cl.
CPC ........... *G06Q 10/063118* (2013.01); *G06Q 10/063112* (2013.01); *G06Q 50/01* (2013.01)

(58) Field of Classification Search
CPC ... G06Q 10/063118; G06Q 10/063112; G06Q 50/01
See application file for complete search history.

(56) References Cited

U.S. PATENT DOCUMENTS

| 7,885,844 B1 | 2/2011 | Cohen et al. |
| 8,255,258 B1 | 8/2012 | Cohen et al. |
| 8,392,235 B1 | 3/2013 | Cohen et al. |
| 2008/0270313 A1* | 10/2008 | Cullen .................... G06Q 10/06 705/80 |
| 2013/0290063 A1* | 10/2013 | Gonzalez Diaz ...... G06Q 10/06 705/7.25 |
| 2013/0293551 A1* | 11/2013 | Erez ....................... G06T 11/206 345/440 |
| 2014/0343984 A1* | 11/2014 | Shahabi ........... G06Q 10/06311 705/7.13 |
| 2015/0086072 A1* | 3/2015 | Kompalli ........... G06K 9/00228 382/103 |

(Continued)

OTHER PUBLICATIONS

[CSCSW2013] A. Kittur et al., "The future of Crowd Work", *CSCW*, 2013.

(Continued)

*Primary Examiner* — Sujay Koneru
(74) *Attorney, Agent, or Firm* — Jones Robb, PLLC

(57) ABSTRACT

The disclosed embodiments illustrate methods and systems for crowdsourcing a task. The method includes identifying a first set of workers from workers, based on a performance of the workers on a set of tasks previously attempted by the workers, and a Service Level Agreement (SLA) associated with the task. The method further includes generating a graph comprising nodes and edges connecting the nodes. Each of the one or more nodes is indicative of a worker. An edge, connecting two workers, is indicative of said two workers having worked together on at least one task. The method further includes receiving an input, to select a second set of workers from the first set of workers, based on one or more first parameters associated with each of the nodes in said graph and second parameters associated with each of the edges in the graph.

10 Claims, 8 Drawing Sheets

(56) References Cited

U.S. PATENT DOCUMENTS

| | | | |
|---|---|---|---|
| 2015/0120350 A1* | 4/2015 | Gujar | G06Q 10/063112 705/7.14 |
| 2015/0220871 A1* | 8/2015 | Rajan | G06Q 10/063112 705/7.14 |
| 2015/0242798 A1* | 8/2015 | Zou | G06Q 10/063114 705/7.15 |
| 2015/0325102 A1* | 11/2015 | Mondal | H04L 67/04 340/539.11 |
| 2016/0140477 A1* | 5/2016 | Karanam | G06Q 10/063112 705/7.14 |
| 2016/0180278 A1* | 6/2016 | Celis | G06Q 10/063114 705/7.15 |
| 2016/0253605 A1* | 9/2016 | Zou | G06Q 10/0633 705/7.26 |
| 2017/0039505 A1* | 2/2017 | Prabhakara | G06Q 10/063118 |
| 2017/0076241 A1* | 3/2017 | Kunde | G06Q 10/063112 |

OTHER PUBLICATIONS

K.H. Lim, The Identification of Like-minded Communities on Online Social Networks, Master Thesis, University of Western Australia, 2013.

Ulrik Brandes, Daniel Delling, Marco Gaertler, Robert Grke, Martin Hoefer, Zoran, Nikoloski and Dorothea Wagner. On modularity clustering. IEEE Transactions on Knowledge and Data Engineering, vol. 20, No. 2, pp. 172-188, Feb. 2008.

Jeff Huang, Katherine M. Thornton and Efthimis N. Efthimiadis. Conversational tagging in twitter. In HT '10: Proceedings of the 21st ACM Conference on Hypertext and Hypermedia, pp. 1079-1088, Jun. 2010.

G. Iyer, D. Soberman, and J.M. Villas Boas. The targeting of Advertising. Marketing Science, vol. 24, No. 3, pp. 461-475, 2005.

Andrea Lancichinetti and Santo Fortunato. Community detection algorithms: A comparative analysis. Physical Review E, vol. 80, No. 5, pp. 56-117, Nov. 2009.

* cited by examiner

METHOD AND SYSTEM FOR CROWDSOURCING TASKS

TECHNICAL FIELD

The presently disclosed embodiments are related, in general, to crowdsourcing. More particularly, the presently disclosed embodiments are related to methods and systems for crowdsourcing tasks to one or more workers.

BACKGROUND

Crowdsourcing platforms provide an online job market where workers connect to a crowdsourcing platform server and execute tasks posted by requestors. Crowdsourcing platforms may have numerous registered workers for executing tasks on the crowdsourcing platforms. However, the requestors may not know the availability of workers who may potentially meet the Service Level Agreements (SLAs) associated with the tasks (posted by the requestors). This kind of uncertainty about the availability of the workers may affect turn-around-times of the tasks and Service Level Agreements (SLAs) associated with the tasks. Further, the requestors may not have an option to select a worker from the one or more workers that may process the tasks posted by them.

SUMMARY

According to embodiments illustrated herein, there is provided a method for crowdsourcing a task. The method includes identifying a first set of workers from one or more workers, based on a performance of the one or more workers on a set of tasks previously attempted by the one or more workers, and a Service Level Agreement (SLA) associated with the task. The method further includes generating a graph comprising one or more nodes and one or more edges connecting the one or more nodes. Each of the one or more nodes is indicative of a worker from the first set of workers. An edge from the one or more edges, connecting two workers from the first set of workers, is indicative of said two workers having worked together on at least one task. Thereafter, the method further includes receiving an input to select a second set of workers from the first set of workers, based on one or more first parameters associated with each of the one or more nodes in the graph and one or more second parameters associated with each of the one or more edges in the graph. The method is performed by the one or more microprocessors.

According to embodiments illustrated herein, there is provided a method for recommending one or more tasks to a worker. The method includes identifying a first set of tasks from the one or more tasks based on one or more constraints specified by the worker. The method further includes generating a graph comprising one or more nodes and one or more edges connecting the one or more nodes. Each of the one or more nodes is indicative of a task from the first set of tasks. An edge from the one or more edges, connecting two tasks from said first set of tasks, is indicative of one or more common characteristics corresponding to the two tasks. Thereafter, the method includes receiving an input to select a second set of tasks from the first set of tasks, based on one or more first parameters associated with each of the one or more nodes in the graph and one or more second parameters associated with each of the one or more edges in the graph. The method is performed by the one or more microprocessors.

According to embodiments illustrated herein, there is provided a system crowdsourcing a task. The system includes one or more microprocessors configured to identify a first set of workers from one or more workers, based on a performance of said one or more workers on a set of tasks previously attempted by said one or more workers and a Service Level Agreement (SLA) associated with said task. The one or more microprocessors are further configured to generate a graph comprising one or more nodes and one or more edges connecting said one or more nodes. Each of said one or more nodes is indicative of a worker from said first set of workers. An edge from said one or more edges, connecting two workers from said first set of workers, is indicative of said two workers having worked together on at least one task. Thereafter, the one or more microprocessors are configured to receive an input to select a second set of workers from said first set of workers, based on one or more first parameters associated with each of said in said graph and one or more second parameters associated with each of said one or more edges in said graph.

According to embodiments illustrated herein, there is provided a system for recommending one or more tasks to a worker. The system includes one or more microprocessors configured to identify a first set of tasks from said one or more tasks based on said one or more constraints specified by the worker. The one or more microprocessors are further configured to generate a graph comprising one or more nodes and one or more edges connecting said one or more nodes. Each of said one or more nodes is indicative of a task from said first set of tasks. An edge from said one or more edges, connecting two tasks from said first set of tasks, is indicative of one or more common characteristics corresponding to said two tasks. Thereafter, the one or more microprocessors are configured to receive an input to select a second set of tasks from said first set of tasks, based on one or more first parameters associated with each of said one or more nodes in the graph and one or more second parameters associated with each of said one or more edges in said graph.

According to embodiments illustrated herein, there is provided a computer program product for use with a computer, the computer program product comprising a non-transitory computer readable medium, wherein the non-transitory computer readable medium stores a computer program code for crowdsourcing a task. The computer program code is executable by one or more microprocessors to identify a first set of workers from one or more workers, based on a performance of said one or more workers on a set of tasks previously attempted by said one or more workers and a Service Level Agreement (SLA) associated with said task. The computer program code is further executable by one or more microprocessors to generate a graph comprising one or more nodes and one or more edges connecting said one or more nodes. Each of said one or more nodes is indicative of a worker from said first set of workers. An edge from said one or more edges, connecting two workers from said first set of workers, is indicative of said two workers having worked together on at least one task. Thereafter, the computer program code is further executable by one or more microprocessors to receive an input to select a second set of workers from the first set of workers, based on one or more first parameters associated with each of the one or more nodes in the graph and one or more second parameters associated with each of the one or more edges in the graph.

According to embodiments illustrated herein, there is provided a computer program product for use with a computer, the computer program product comprising a non-transitory computer readable medium, wherein the non-transitory computer readable medium stores a computer program code for recommending one or more tasks to a worker. The computer program code is executable by one or more microprocessors to identify a first set of tasks from one or more tasks based on one or more constraints specified by worker. The computer program code is further executable by one or more microprocessors to generate a graph comprising one or more nodes and one or more edges connecting said one or more nodes. Each of said one or more nodes is indicative of a task from said first set of tasks. An edge from said one or more edges, connecting two tasks from said first set of tasks, is indicative of one or more common characteristics corresponding to said two tasks. Thereafter, the computer program code is executable by one or more microprocessors to receive an input to select a second set of tasks from said first set of tasks, based on one or more first parameters associated with each of said one or more nodes in said graph and one or more second parameters associated with each of said one or more edges in said graph.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
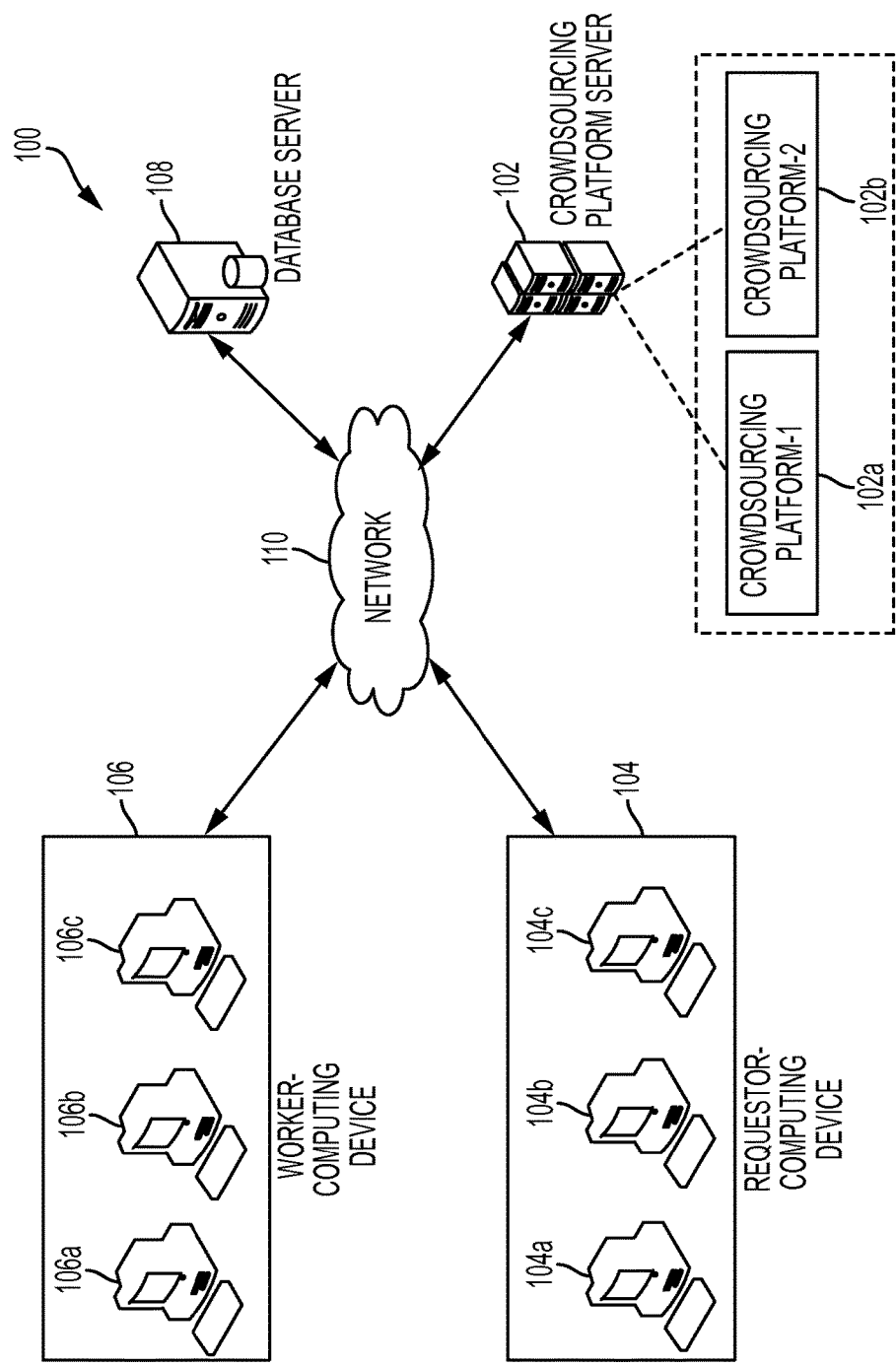
FIG. 1 is a block diagram of a system environment, in which various embodiments can be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment", "at least one embodiment", "an embodiment", "one example", "an example", "for example", and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below.

"Crowdsourcing" refers to distributing tasks by soliciting the participation of loosely defined groups of individual crowdworkers. A group of crowdworkers may include, for example, individuals responding to a solicitation posted on a certain website such as, but not limited to, Amazon Mechanical Turk, Crowd Flower, or Mobile Works.

A "crowdsourcing platform" refers to a business application, wherein a broad, loosely defined external group of people, communities, or organizations provide solutions as outputs for any specific business processes received by the application as inputs. In an embodiment, the business application may be hosted online on a web portal (e.g., crowdsourcing platform servers). Examples of the crowdsourcing platforms include, but are not limited to, Amazon Mechanical Turk, Crowd Flower, or Mobile Works.

A "worker" refers to a workforce/worker(s) that may perform one or more tasks that generate data that contributes to a defined result. According to the present disclosure, the worker(s) includes, but is not limited to, a satellite center employee, a rural business process outsourcing (BPO) firm employee, a home-based employee, or an internet-based employee. Hereinafter, the terms "remote worker", "crowdsourced workforce", and "crowd" may be used interchangeably. The worker may perform the crowdsourcing tasks using various types of devices such as, but not limited to, a laptop, a mobile phone, a PDA, a tablet, a phablet, and the like.

A "crowdsourcing task" refers to a piece of work, an activity, an action, a job, an instruction, or an assignment to be performed. Tasks may necessitate the involvement of one or more workers. Examples of tasks may include, but are not limited to, image/video/text labelling/tagging/categorisation, language translation, data entry, handwriting recognition, product description writing, product review writing, essay writing, address look-up, website look-up, hyperlink testing, survey completion, consumer feedback, identifying/removing vulgar/illegal content, duplicate checking, problem solving, user testing, video/audio transcription, targeted photography (e.g., of product placement), text/image-analysis, directory compilation, or information search/retrieval.

A "first graph" refers to a representation of one or more nodes that are connected with each other through one or more edges. In an embodiment, the one or more nodes may represent one or more workers. On the other hand, an edge from the one or more edges, connecting two workers from the one or more workers, may represent that the two workers may have previously worked together on at least one task.

A "second graph" refers to a representation of one or more nodes that are connected with each other through one or more edges. In an embodiment, the one or more nodes may represent one or more tasks. On the other hand, the one or more edges may represent one or more common characteristics corresponding to the one or more tasks.

"First Parameters" refer to parameters associated with each of the one or more nodes in the first graph and the second graph. In an embodiment, the one or more first parameters may include, but are not limited to, a node size and a node color.

"Second Parameters" refer to parameters associated with each of the one or more edges in the first graph and the second graph. In an embodiment, the one or more second parameters may include, but not limited to, an edge thickness and an edge color.

A "service level agreement (SLA)" refers to terms in a contract that are associated with the task posted by the requestor. In an embodiment, the SLA may state the expectations agreed upon by the crowdsourcing platform with the requestor. For example, the SLA associated with the task may include a task completion time, an accuracy, a percentage of tasks to be completed in a predefined time, an expected quality of a task, and a remuneration associated with the task.

"Constraints" refer to requirements specified by the worker for selecting a task. In an embodiment, the constraints may include, but are not limited to, a worker availability, a task type, a task complexity, a worker qualification, an expected remuneration, and requestor preferences.

"Historical data" refers to statistical data associated with the processing of the one or more tasks by one or more workers over a period of time. In an embodiment, the historical data may include a measure of one or more performance metrics recorded/observed during processing of the one or more tasks by the one or more workers. In an embodiment, the one or more performance metrics may include, but are not limited to, a task accuracy, a task quality, a time completion time, etc. In an embodiment, the historical data may be collected from the one or more crowdsourcing platforms at regular intervals of time. Further, the historical data may further be maintained from a worker's perspective. Such historical data may include information pertaining to a time at which the one or more workers are active/available and are ready to accept tasks. Further, the historical data pertaining to the one or more workers may include performance of each of the one or more workers, or skill set of the one or more workers.

"Task Accuracy" refers to a ratio of a number of correct responses to a total number of responses provided by a worker for one or more tasks attempted by the worker. For example, if a worker attempts 10 tasks and provides correct responses for 7 tasks, the task accuracy of the worker is 0.7 (i.e., 7/10). In an embodiment, the task accuracy may correspond to an average accuracy score attained by one or more workers who attempt a particular task. For example, four workers attempt a task and attain accuracy scores of 0.5, 0.6, 0.7, and 0.8. In this scenario, the task accuracy for the particular task is the average of the accuracy scores of the individual workers, i.e., 0.65 (i.e., (0.5+0.6+0.7+0.8)/4). Thus, a person skilled in the art would appreciate that the term "task accuracy" may refer to the accuracy score attained by a worker who attempts multiple tasks and alternatively the task accuracy may be task specific and correspond to the average of task accuracy scores attained by multiple workers who attempt a particular task.

"Task Completion time" refers to a time consumed by a worker to complete a task.

"Task Complexity" refers to an intricacy involved with the task, which may be indicative of an effort required by a worker to perform the task. For example, an image-tagging task may be a less complex task as compared to an essay-writing task.

"Task Type" refers to a categorization of tasks such that tasks of each task type may require a performance of similar type of steps. Examples of task type may include, but are not limited to, image/video/text labelling/tagging/categorisation, language translation, data entry, handwriting recognition, product description writing, product review writing, essay writing, address look-up, website look-up, hyperlink testing, survey completion, consumer feedback, identifying/removing vulgar/illegal content, duplicate checking, problem solving, user testing, video/audio transcription, targeted photography (e.g., of product placement), text/image-analysis, directory compilation, or information search/retrieval.

"Events" may refer to at least one of an unavailability of the first set of workers, an expiration of the task, and one or more changes in the SLA associated with the task. In an embodiment, based on a detection of the events, the first graph and the second graph are updated.

"Utility" refers to a weighted sum of accuracy and task completion time for the workers. In an embodiment, the requestor may define the utility as high accuracy and less task completion time.

"Degree of geographical proximity" refers to a measure of distance between locations associated with two individuals. In an embodiment, the two individuals may be two requestors, two workers, or a requestor and a worker.

A "remuneration" refers to a reward paid to the worker for completing a task posted on the crowdsourcing platform server. In an embodiment, examples of the reward may include, but are not limited to, a monetary compensation, lottery tickets, gift items, shopping vouchers, and discount coupons. In another embodiment, the reward may further correspond to strengthening of the relationship between the worker and the requestor. For example, the requestor may provide the worker with an access to more tasks so that the worker can gain more. In addition, through rewards, the crowdsourcing platform may improve a reputation score associated with the worker. In an embodiment, the worker with a higher reputation score may receive a higher reward. A person skilled in the art would understand that combination of any of the above-mentioned means of reward could be used and the task completion cost for the requestors may be inclusive of such rewards receivable by the corresponding workers.

FIG. 1 is a block diagram of a system environment 100, in which various embodiments can be implemented. The system environment 100 includes a crowdsourcing platform server 102, one or more requestor-computing devices 104a, 104b, and 104c (hereinafter collectively referred as requestor-computing device 104), one or more worker-computing devices 106a, 106b, and 106c (hereinafter collectively referred as worker-computing device 106), a database server 108, and a network 110.

The crowdsourcing platform server 102 refers to a computing device that is configured to host one or more crowdsourcing platforms (e.g., crowdsourcing platform-1 102a and crowdsourcing platform-2 102b, depicted in the system environment 100). In an embodiment, the crowdsourcing platform 102a may receive one or more crowdsourcing tasks by the requestor from the requestor-computing device 104. Thereafter, the crowdsourcing platform 102a may communicate the crowdsourcing tasks (received from the requestor-computing device 104) to the one or more workers. In an embodiment, the crowdsourcing platform server 102 may identify a first set of workers from the one or more workers. The first set of workers may be identified based on a performance of the one or more workers on a set of tasks previously attempted by the one or more workers, and a Service Level Agreement (SLA) associated with the task. In another embodiment, the crowdsourcing platform server 102 may identify the first set of workers based on at least a weighted sum of the accuracy on the tasks attempted by each of the one or more workers and an average task completion time corresponding to the one or more workers, on the previously attempted tasks. In an embodiment, the accuracy may correspond to a number of correct responses provided by a worker for the one or more tasks (posted by the requestor). On the other hand, the task completion time may correspond to a time consumed by the worker to complete the task.

In an embodiment, the crowdsourcing platform server 102 may generate a first graph for crowdsourcing a task. The first graph may include one or more nodes and one or more edges connecting the one or more nodes. Each of the one or more nodes may be indicative of a worker from the first set of workers. Further, an edge from the one or more edges may connect two workers from the first set of workers, indicating that the two workers may have previously worked together on at least one task. In an embodiment, the crowdsourcing platform server 102 may display the first graph to a requestor (who has requested to crowdsource the task under consideration) on a display screen of the requestor-computing device 104. Thereafter, the crowdsourcing platform server 102 may receive an input from the requestor to select a second set of workers from the first set of workers. In an embodiment, the crowdsourcing platform server 102 may select the second set of workers based on one or more first parameters associated with each of the one or more nodes and one or more second parameters associated with each of the one or more edges in the first graph. Based on the selection, the crowdsourcing platform server 102 may facilitate access of the task to the second set of workers.

In another embodiment, the crowdsourcing platform server 102 may facilitate a direct communication between the requestor associated with the requestor-computing device 104 and at least one worker from the second set of workers. For the direct communication, the crowdsourcing platform server 102 may allow the requestor and the at least one worker to negotiate terms of the Service Level Agreement (SLA) associated with the task.

In an embodiment, the crowdsourcing platform server 102 may recommend one or more tasks to the worker. The crowdsourcing platform server 102 may identify a first set of tasks from the one or more tasks based on one or more constraints specified by the worker. The one or more constraints may include, but are not limited to, a worker availability, a task type, a task complexity, a worker qualification, an expected remuneration, or requestor preferences. In an embodiment, the crowdsourcing platform server 102 may identify the first set of tasks based on at least a weighted sum of the one or more constraints. In an embodiment, the crowdsourcing platform server 102 may generate a second graph for recommending one or more tasks to the worker. The second graph may include one or more nodes and one or more edges connecting the one or more nodes. Each of the one or more nodes may be indicative of a task from the first set of tasks. Further, an edge from the one or more edges may connect two tasks from the first set of tasks, indicative of one or more common characteristics corresponding to the first set of tasks. In an embodiment, the crowdsourcing platform server 102 may display the second graph to the worker on a display screen of the worker-computing device 106. Further, in an embodiment, the crowdsourcing platform server 102 may receive an input from the worker-computing device 106 to select a second set of tasks from the first set of tasks. The first set of tasks may include at least one task sent by the requestor to the worker for processing. The crowdsourcing platform server 102 may select the second set of tasks based on one or more first parameters associated with each of the one or more nodes in the second graph and one or more second parameters associated with each of the one or more edges in the second graph. Thereafter, the crowdsourcing platform server 102 may facilitate access of the second set of tasks to the worker. In an embodiment, the crowdsourcing platform server 102 may facilitate a direct communication between the worker and at least one requestor associated with selected second set of tasks. In an embodiment, the requestor and the worker may use a communication channel to negotiate the terms of the SLA associated with the processing of the selected tasks.

In an embodiment, the crowdsourcing platform server 102 may update the graph (i.e., the first graph and the second graph) either periodically or based on a detection of an event. The event may include an unavailability of the first set of workers, an expiration of the task, and one or more changes in the SLA associated with the task.

The crowdsourcing platform server 102 may be realized through various types of application servers such as, but not limited to, Java application server, .NET framework, and Base4 application server.

The requestor-computing device 104 may refer to a computing device, used by the requestor, to upload information pertaining to the one or more crowdsourcing tasks on the crowdsourcing platform server 102 over the network 110. In an embodiment, the requestor may access the crowdsourcing platform server 102, to upload the information. For example, if the crowdsourcing task corresponds to the digitization of the handwritten content, the requestor may provide electronic documents that include handwritten content. In an embodiment, the requestor may validate one or more responses submitted by the worker associated with the one or more crowdsourcing tasks. In an embodiment, the requestor-computing device 104 may receive the first graph from the crowdsourcing platform server 102, which may be presented to the requestor on a display screen of the requestor-computing device 104. Based on the first graph, the requestor may provide an input pertaining to the selection of the second set of workers, from the first set of workers. The selection may be done based on the one or more first parameters associated with each of the one or more nodes in the first graph and the one or more second parameters associated with each of the one or more edges in the first graph. An embodiment of the selection of the second set of workers has been described in conjunction with FIG. 3.

The requester-computing device 104 may be implemented as a variety of computing devices such as a desktop, a computer server, a laptop, a personal digital assistant (PDA), a tablet computer, a mobile phone, a smartphone, and the like.

The worker-computing device 106 refers to a computing device, used by the worker, to perform the second set of tasks selected by the worker associated with the worker-computing device 106. In an embodiment, the worker may receive the one or more crowdsourcing tasks on a display associated with the worker-computing device 106. Subsequently, the worker may submit responses to the one or more crowdsourcing tasks using the worker-computing device 106. The worker may provide responses to the one or more crowdsourcing tasks using one or more input devices (e.g., keyboard, touch-interface, gesture-recognition, etc.) associated with the worker-computing device 106. In an embodiment, the worker-computing device 106 may receive the second graph from the crowdsourcing platform server 102, which may be presented to the worker on a display screen associated with the worker-computing device 106. Based on the second graph, the worker may provide an input pertaining to the selection of the second set of tasks, from the first set of tasks. The selection may be done based on the one or more first parameters associated with each of the one or more nodes in the second graph and the one or more second parameters associated with each of the one or more edges in the second graph. An embodiment of the selection of the second set of tasks has been described further in conjunction with FIG. 4.

The worker-computing device 106 may be implemented as a variety of computing devices such as a laptop, a personal digital assistant (PDA), a tablet computer, a mobile phone, a smartphone, a phablet, and the like.

The database server 108 may refer to a device or a computer that maintains a repository of tasks assigned to the one or more workers. In an embodiment, the database server 108 may store the profile information associated with the workers and the requestors. In an embodiment, the database server 108 may store the one or more constraints associated with each of the one or more workers. The one or more constraints associated with each of the one or more workers may include, but are not limited to a worker availability, a task type, a task complexity, a worker qualification, an expected remuneration, and requestor preferences. Further, in an embodiment, the database server 108 may store the one or more first parameters associated with the first set of workers, and the one or more second parameters associated with the first set of tasks. Typically, in such scenarios, the database server 108 may store historical data associated with each of the one or more workers and the one or more requestors. The historical data may be utilized by the crowdsourcing platform server 102 to analyze a performance of a crowdsourcing system associated with the system environment 100. In an embodiment, the database server 108 may store the SLA associated with each of the one or more tasks to be crowdsourced. The SLA associated with each of the one or more tasks may include, but are not limited to a task completion time, an accuracy, a percentage of tasks to be completed in a predefined time, an expected quality of a task, and a remuneration associated with the task. The database server 108 may receive a query from the crowdsourcing platform server 102 to retrieve the profile information associated with the one or more workers and the one or more requestors. For querying the database server 108, one or more querying languages may be utilized such as, but not limited to, SQL, QUEL, DMX and so forth. In an embodiment, the crowdsourcing platform server 102 may connect to the database server 108 using one or more protocols such as, but not limited to, ODBC protocol and JDBC protocol. The database server 108 may be realized through various technologies such as, but not limited to, Microsoft® SQL server, Oracle, and My SQL.

It will be apparent to a person skilled in the art that the functionalities of the database server 108 may be incorporated into the crowdsourcing platform server 102, without departing from the scope of the disclosure.

The network 110 corresponds to a medium through which content and messages flow between various devices of the system environment 100 (e.g., the crowdsourcing platform server 102 the requestor-computing device 104, the worker-computing device 106, and the database server 108). Examples of the network 110 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 110 in accordance with various wired and wireless communication protocols such as Transmission Control Protocol and Internet Protocol (TCP/IP), User Datagram Protocol (UDP), and 2G, 3G, or 4G communication protocols.

Figure 2:
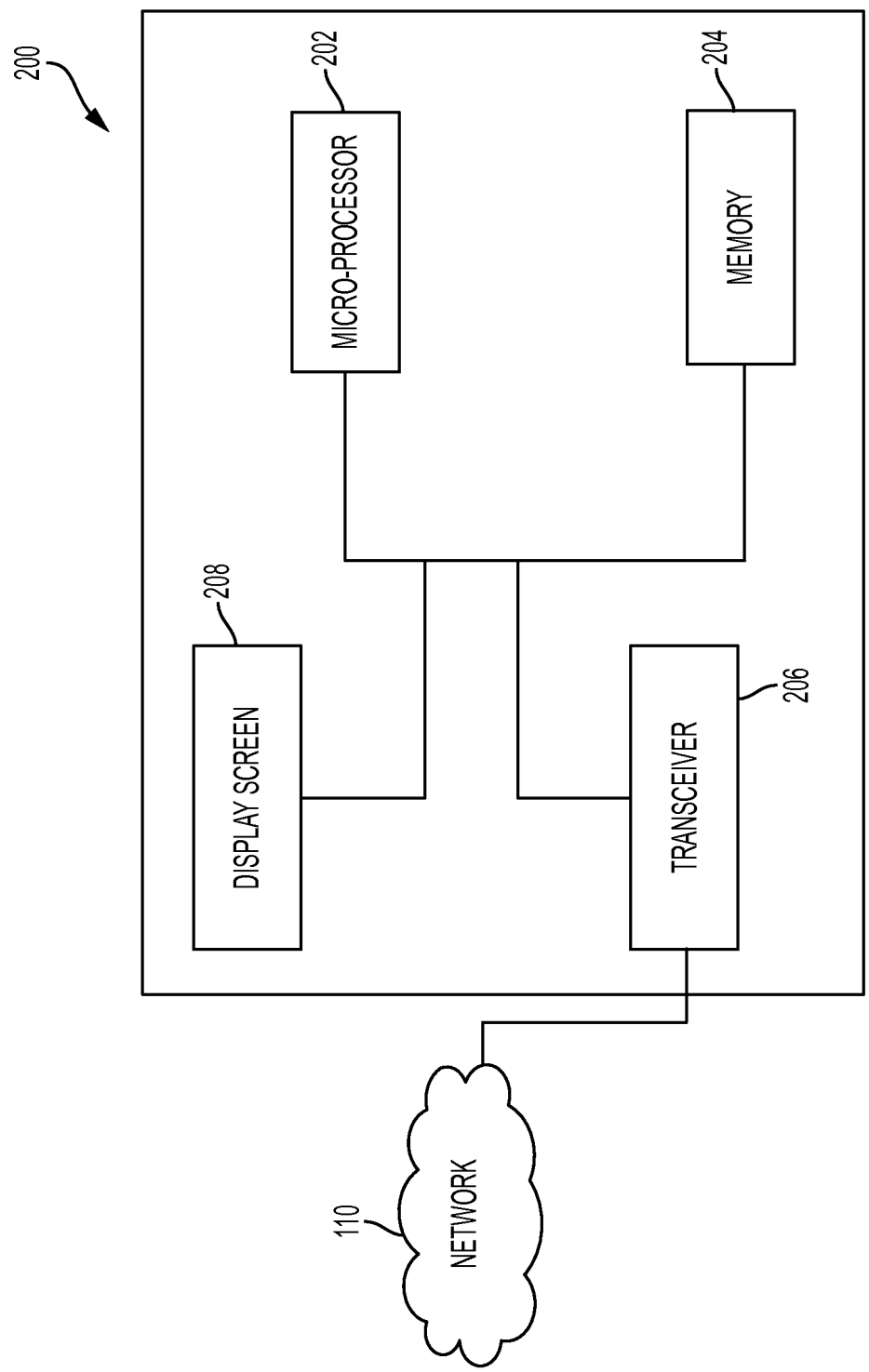
FIG. 2 is a block diagram illustrating a computing device, in accordance with at least one embodiment.

FIG. 2 is a block diagram that illustrates a computing device 200 for crowdsourcing a task or for recommending one or more crowdsourcing tasks to a worker, in accordance with at least one embodiment. For the purpose of ongoing description, the computing device 200 is considered to be the crowdsourcing platform server 102. However, the scope of the disclosure should not be limited to the crowdsourcing platform server 102. The computing device 200 may also be realized as the requestor-computing device 104 or the worker-computing device 106.

The computing device 200 includes a microprocessor 202, a memory 204, a transceiver 206, and a display screen 208. The microprocessor 202 is coupled to the memory 204, the transceiver 206, and the display screen 208. The transceiver 206 is connected to the network 110.

The microprocessor 202 includes suitable logic, circuitry, and/or interfaces that are operable to execute one or more instructions stored in the memory 204 to perform predetermined operations. The microprocessor 202 may be implemented using one or more microprocessor technologies known in the art. Examples of the microprocessor 202 include, but are not limited to, an x86 microprocessor, an ARM microprocessor, a Reduced Instruction Set Computing (RISC) microprocessor, an Application-Specific Integrated Circuit (ASIC) microprocessor, a Complex Instruction Set Computing (CISC) microprocessor, or any other microprocessor.

A person having ordinary skills in the art would understand that the scope of the disclosure is not limited to having a microprocessor 202 to perform one or more operations on the crowdsourcing platform server 102. In an embodiment, the crowdsourcing platform server 102 may further include a graph microprocessor (not shown) that may be configured to perform graph related mathematical/logical operations. For example, the graph microprocessor may be configured to create the first graph and the second graph. Further, the graph microprocessor may further be capable of performing various operations on the graph such as a depth first search, a breadth first search, a spanning through the graph, a transformation of the graph into a different dimensional space, etc. In an embodiment, the graph microprocessor may be implemented using one or more known technologies such as ASIC, FPGA, SoC, etc. In an embodiment, the graph microprocessor may be coupled to the microprocessor 202.

The memory 204 stores a set of instructions and data. Some of the commonly known memory implementations include, but are not limited to, a random access memory (RAM), a read only memory (ROM), a hard disk drive (HDD), and a secure digital (SD) card. Further, the memory 204 includes the one or more instructions that are executable by the microprocessor 202 to perform specific operations. It is apparent to a person having ordinary skills in the art that the one or more instructions stored in the memory 204 enable the hardware of the computing device 200 to perform the predetermined operations.

The transceiver 206 transmits and receives messages and data to/from various components of the system environment 100 (e.g., the requestor-computing device 104, the worker-computing device 106, and the database server 108) over the network 110. Examples of the transceiver 206 may include, but are not limited to, an antenna, an Ethernet port, a USB port, or any other port that can be configured to receive and transmit data. The transceiver 206 transmits and receives data/messages in accordance with the various communication protocols, such as, TCP/IP, UDP, and 2G, 3G, or 4G communication protocols.

The display screen 208 may comprise suitable logic, circuitry, interfaces, and/or code that may be operable to render a display screen. In an embodiment, the display screen 208 may be realized through several known technologies, such as, Cathode Ray Tube (CRT) based display, Liquid Crystal Display (LCD), Light Emitting Diode (LED) based display, Organic LED display technology, and Retina display technology. In an alternate embodiment, the display screen 208 may be capable of receiving input from the worker or from the requestor. In such a scenario, the display screen 208 may be a touch screen that enables the worker or the requestor to provide input. In an embodiment, the touch screen may correspond to at least one of a resistive touch screen, a capacitive touch screen, or a thermal touch screen. In an embodiment, the display screen 208 may receive input through a virtual keypad, a stylus, a gesture, and/or touch based input.

Figure 3:
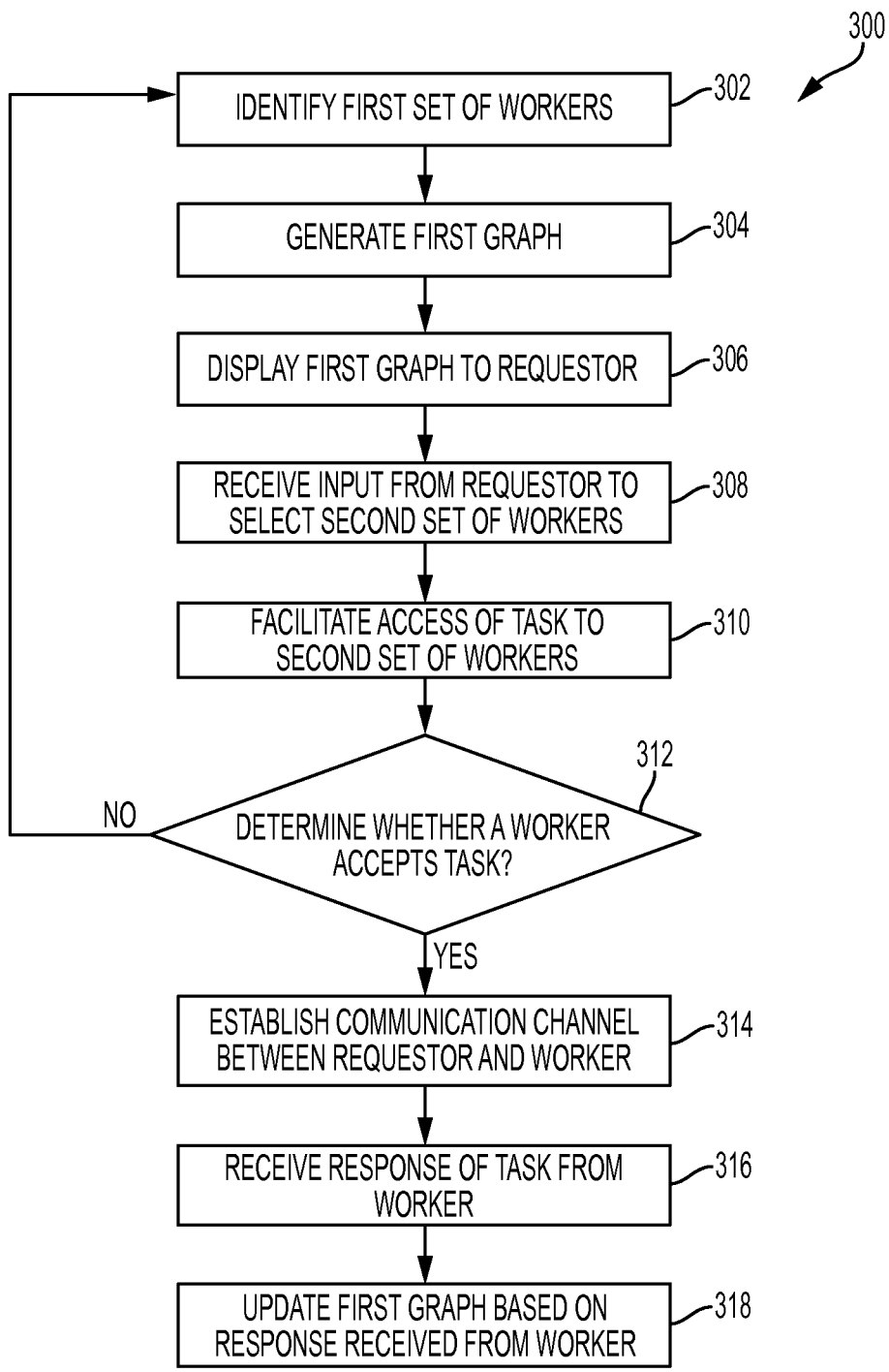
FIG. 3 is a flowchart illustrating a method for crowdsourcing a task, in accordance with at least one embodiment.

FIG. 3 is a flowchart 300 illustrating a method for crowdsourcing a task, in accordance with at least one embodiment. The flowchart 300 is described in conjunction with FIG. 1 and FIG. 2.

At step 302, the first set of workers are identified. In an embodiment, the microprocessor 202 may identify the first set of workers from the one or more workers. In an embodiment, prior to identifying the first set of workers, the microprocessor 202 may retrieve historical data, from the database server 108, pertaining to the one or more tasks previously attempted by the one or more workers. Based on the historical data, the microprocessor 202 may determine performance of the one or more workers on the previously attempted tasks. Based on the performance of the one or more workers, the microprocessor 202 may identify the first set of workers, from the one or more workers. In an embodiment, the microprocessor 202 may compare the performance of the one or more workers with a predetermined threshold value. If the performance of a worker from the one or more workers surpasses the predetermined threshold value, the microprocessor 202 may select the worker in the first set of workers. In an embodiment, the predetermined threshold value may be determined from the service level agreement (SLA) between the requestor (requesting to crowdsource the tasks) and the crowdsourcing platform server 102. In an embodiment, the SLA may include information pertaining to the required task completion time, the accuracy, the percentage of tasks to be completed in a predefined time, the expected quality of a task, and the remuneration associated with the task. The microprocessor 202 may determine the predetermined threshold value based on the information. Following Table 1 illustrates an example SLA:

TABLE 1

Illustration of the SLA associated with the task.

| Worker | Task | Task Completion Time (hours) | Accuracy (%) | % of tasks to be completed in a predefined time | Expected quality of task | Task remuneration (USD) | Workers who worked together |
|---|---|---|---|---|---|---|---|
| Worker_1 (W1) | Task_1 | 1 | 75 | 80 | 85 | 1 | W1&W2 |
| Worker_2 (W2) | Task_2 | 2 | 80 | 75 | 80 | 2 | W2&W3 |
| Worker_3 (W3) | Task_3 | 3 | 85 | 72 | 80 | 2.5 | W2&W3 |

Referring to the Table 1, "Task_1" requires 1 hour for completing the task. The remuneration associated with the task is 1 USD. The percentage of tasks to be completed in a predefined time is 80%. Further, the accuracy of the task is 75%. Therefore, the microprocessor 202 may consider the values of the remuneration, accuracy and the predefined time (mentioned in table 1) as the predetermined threshold value for selecting the first set of workers for the "Task_1".

It will be apparent to a person having ordinary skill in the art that the above Table 1 has been provided only for illustration purposes and should not limit the scope of the disclosure. For example, the SLA associated with the task may be different from the depicted requirements and may include more or less requirements than depicted in the Table 1.

In an alternate embodiment, the first set of workers may be identified based at least on the weighted sum of the accuracy of the one or more workers, and the task completion time corresponding to the one or more workers, for the task. In an embodiment, the microprocessor 202 may employ different Integer Linear Programming (ILP) formulations to identify the first set of workers based on the type of the task posted by the requestor that maximizes a utility, U. The utility, U may correspond to the weighted sum of accuracy and the task completion time for the workers. For example, in an embodiment, the requestor may have a constraint on total payment (P) for the posted task at time, t. Therefore, the requestor may define the utility as high accuracy and less completion time, while maintaining the payment constraint, to identify the first set of workers. In an embodiment, the microprocessor 202 may utilize following equation to determine the utility of a worker:

$$U(R,t,i) = w_1 A(i,t,T) - w_2 C(i,t,T) \quad (1)$$

where,
U(R,t,i)=Utility of worker i at time t for requestor R;
$w_1$, $w_2$=weights assigned to accuracy and completion time, respectively;
A(i,t,T)=Accuracy of worker, i at time t for a task T;
C(i,t,T)=Completion time by worker i at time t for a type of task T.

In an embodiment, the microprocessor 202 may formulate the ILP as follows:

$$\text{Max } U(R,t,i)x_i \quad (2)$$

$$s.t. \quad (3)$$

$$\Sigma_i v(i,t)x_i \leq P \quad (4)$$

$$x_i \in \{0,1\}; \forall i \quad (5)$$

where,
v(i,t)=Payment for worker, i.

It can be observed from the equation (2), (3), and (4), that the microprocessor 202 maximizes the utility based on the accuracy and the task completion time, keeping the payment constraint. Thus, based on the formulation, the microprocessor 202 may select the first set of workers ({i: $x_i$=1}) for requester, R at time t, for the task, T by utilizing the equations (2), (3), and (4). In another embodiment, the microprocessor 202 may employ different formulations such as clustering techniques. The clustering techniques may include, but are not limited to, a weighted clustering, or a multi-viewed clustering.

It will be apparent to a person having ordinary skill in the art that the above mentioned techniques have been provided only for illustration purposes and should not limit the scope of the disclosure. In an embodiment, the microprocessor 202 may employ different optimization formulation techniques, without departing from the scope of the disclosure.

At step 304, the first graph is generated. In an embodiment, the microprocessor 202 may generate the first graph. In an embodiment, prior to generating the first graph, the microprocessor 202 may retrieve data pertaining to the worker characteristics from the database server 108. The worker characteristics may include, but are not limited to, a worker availability, a task type usually undertaken by the respective workers, a task complexity, a worker qualification, an expected remuneration, and requestor preferences. Based on the worker characteristics and the identified first set of workers (as discussed above), the microprocessor 202 may generate the first graph. The first set of workers may be identified based on the performance of the workers on the previously attempted tasks, as discussed in the step 302. The first graph may include one or more nodes and one or more edges connecting the one or more nodes. Each of the one or more nodes may represent a worker from the first set of workers. Similarly, an edge from the one or more edges, connecting two workers from the first set of workers may represent that the two workers may have previously worked together on at least one task (posted by the requestor). For example, as shown in the Table 1, the "worker_1" worked with "worker_2" on a "task_1" (posted by the requestor) having an accuracy of 75%. Similarly, the "worker_2" worked with "worker_3" on "task_2" and "task_3" (posted by the requestor) having an accuracy of 80% and 85%. Therefore, based on the data, the microprocessor 202 connects the "worker_1" with the "worker_2" by an edge. Similarly, the microprocessor 202 connects the "worker_2" with the "worker_3" by an edge, thus forming the first graph.

In the first graph, the one or more nodes may have associated one or more first parameters. Similarly, the one or more edges may have associated one or more second parameters. The one or more first parameters may include, but not limited to node size, and node color. In an embodiment, the node size in the first graph may indicate at least the familiarity of the worker with the task, or an average accuracy of the worker over the tasks similar to the tasks. In an embodiment, the microprocessor 202 may receive input, from the requestor, indicative of at least one parameter from the one or more first parameters that may be of importance to the requestor. Based on the input, the microprocessor 202 may vary the node size based on the selected parameter. For example, if the requestor selects accuracy as a parameter, then the microprocessor 202 may determine the node size based on the accuracy of the workers. For example, as shown in the Table 1, the Worker_1 and the Worker_2 have an accuracy of 75% and 80% respectively. Based on the accuracy of the workers, the Worker_1 may be represented bigger in size as compared to the Worker_2 in the first graph. Further, the scope of the disclosure should not limited to selecting only one parameter. In an embodiment, the worker may provide input to select more than one constraint. In such a scenario, the requestor may further provide input to assign weightage to each of the selected parameters. The microprocessor 202 may determine the weighted sum of the selected parameters to determine the node size for each worker. Similarly, the microprocessor 202 may utilize the node color in the first graph to indicate charge rate or cost of the worker for attempting the task. For example, in an embodiment, the microprocessor 202 may represent the node color from green to red. With green depicting cheaper charge rate while red depicting higher charge rate. Similarly, the one or more second parameters may include, but are not limited to an edge thickness, and an edge color. The microprocessor 202 may utilize the thickness of an edge to indicate a degree to which the two workers have worked together for the requestor. Similarly, the microprocessor 202 may utilize the edge color to indicate a geographical location of the two workers. For example, if the "Worker_1" belongs to "Delhi", the "Worker_2" belongs to "Agra" and "Worker_3" belongs to "Mumbai", the microprocessor 202 determines the degree of the geographical proximity. In an embodiment, the degree of geographical proximity corresponds to a measure of distance between locations associated with two individuals. In an embodiment, the two individuals may correspond to at least two workers. Based on the degree of the geographical proximity, the microprocessor 202 may utilize two different edge colors in the first graph to indicate the connection between W1&W2 and W2&W3. The graphical representation has been described later in conjunction with the FIG. 4.

At step 306, the first graph is displayed. In an embodiment, the microprocessor 202 may display the first graph to the requestor. The first graph may be displayed on the user interface associated with the requestor-computing device 104. In an embodiment, the microprocessor 202 may generate the first graph, as disclosed above in the step 304.

At step 308, an input is received. In an embodiment, the microprocessor 202 may receive the input from the requestor (using the requestor-computing device 104) to select the second set of workers from the first set of workers. The requestor may provide the input to select the second set of workers based on the one or more first parameters associated with each of the one or more nodes in the first graph and the one or more second parameters associated with each of the one or more edges in the first graph (displayed to the requestor), as discussed above.

At step 310, the microprocessor 202 may facilitate access of the task to the second set of workers. In an embodiment, the microprocessor 202 may facilitate access of the task based on the input received from the requestor. In an embodiment, the microprocessor 202 may display the task to the second set of workers on display screens of the respective worker-computing devices 104. In an embodiment, the task is one of the multitude of tasks displayed to the second set of workers. In an embodiment, the worker may or may not attempt the task. The input may correspond to the selection of the second set of workers, as discussed in the step 308.

At step 312, it is determined whether a worker from the second set of workers accepts the task. The microprocessor 202 may determine this based on a response received from the worker. In an embodiment, each of the worker from the second set of workers may have an option of accepting the task or discarding the task. If the worker accepts the task, step 314 is performed, or else the step 302 is performed.

At step 314, in an embodiment, a communication channel between the requestor and the worker (who provided input indicative of his/her acceptance of the task) is established. In an embodiment, the microprocessor 202 may establish the communication channel. In an embodiment, the communication channel may correspond to a chat window that may be displayed on the computing device associated with the worker (i.e., the worker-computing device 106) and the requestor (i.e., the requestor-computing device 104). The worker and requestor may communication with each other to understand problems and expectations associated with the task. Further worker and the requestor may utilize the channel to negotiate the terms of the SLA associated with the task (such as remuneration or turnaround time of the task). In an embodiment, the microprocessor 202 may assign a unique session id to the chat communication between the requestor and the worker. A person having ordinary skill in the art would understand that the scope of the disclosure is not limited to communicating through the chat window. In an embodiment, the microprocessor 202 may provide contact information about the requestor to the worker and vice versa. In an embodiment, the contact information may include an email address, a telephone number, or a mobile number, and/or any other means through the requestor may reach out to the worker and vice versa.

In an embodiment, the communication channel may exist between the workers and the requestors until the time workers are executing the tasks. Once, the worker submits the task, the communication channel is destroyed. Since the requestor is directly in contact with the workers executing the tasks posted by the requestor, a virtual organization type environment is created. In an embodiment, the virtual organization architecture enables the requestor and the workers to not only negotiate the terms of the SLA, but also allow workers and the requestors to discuss other aspects of the task. For example, the worker may discuss objective of the task, problems/doubts that may arise while performing the task, etc. This may further help the worker to meet the SLA requirements set by the requestor.

At step 316, a response of the task is received. The microprocessor 202 may receive the response of the task from the worker.

At step 318, the first graph is updated. The microprocessor 202 may update the first graph based on responses received from each worker in the second set of workers. In an embodiment, the microprocessor 202 may update the first graph based on a detection of an event. The event may include, but is not limited to, an unavailability of the first set of workers, an expiration of the task, or one or more changes in the SLA associated with the task. For example, if the microprocessor 202 detects that the task (posted by the requestor) may require 90% accuracy having task completion time of 4 hours. From the Table 1, it can be observed that the no worker has the capability that may satisfy the requirement (or the SLA) of the task. Therefore, typically in such type of scenarios, the microprocessor 202 may update the first graph periodically. In another scenario, if the microprocessor 202 detects that the task (posted by the requestor) may require 0.5 hours for completing the task having expected quality of task "90". From the Table 1, it can be observed that the no worker has the capability that may satisfy the requirement (or the SLA) of the task. Therefore, typically in such type of scenarios, the microprocessor 202 may update the first graph by adding new workers.

As discussed, if at the step 312, it is determined that the worker from the second set of workers does not accept the task, the microprocessor 202 may repeat the step 302. In such a scenario, the microprocessor 202 may identify another first set of workers from the one or more workers. In case if one or more new workers may have been added in the system, then the microprocessor 202 may update the previously generated first graph to include the one or more new workers.

It will be apparent to a person having ordinary skill in the art that the above-mentioned events have been provided only for illustration purposes and should not limit the scope of the disclosure.

Figure 4:
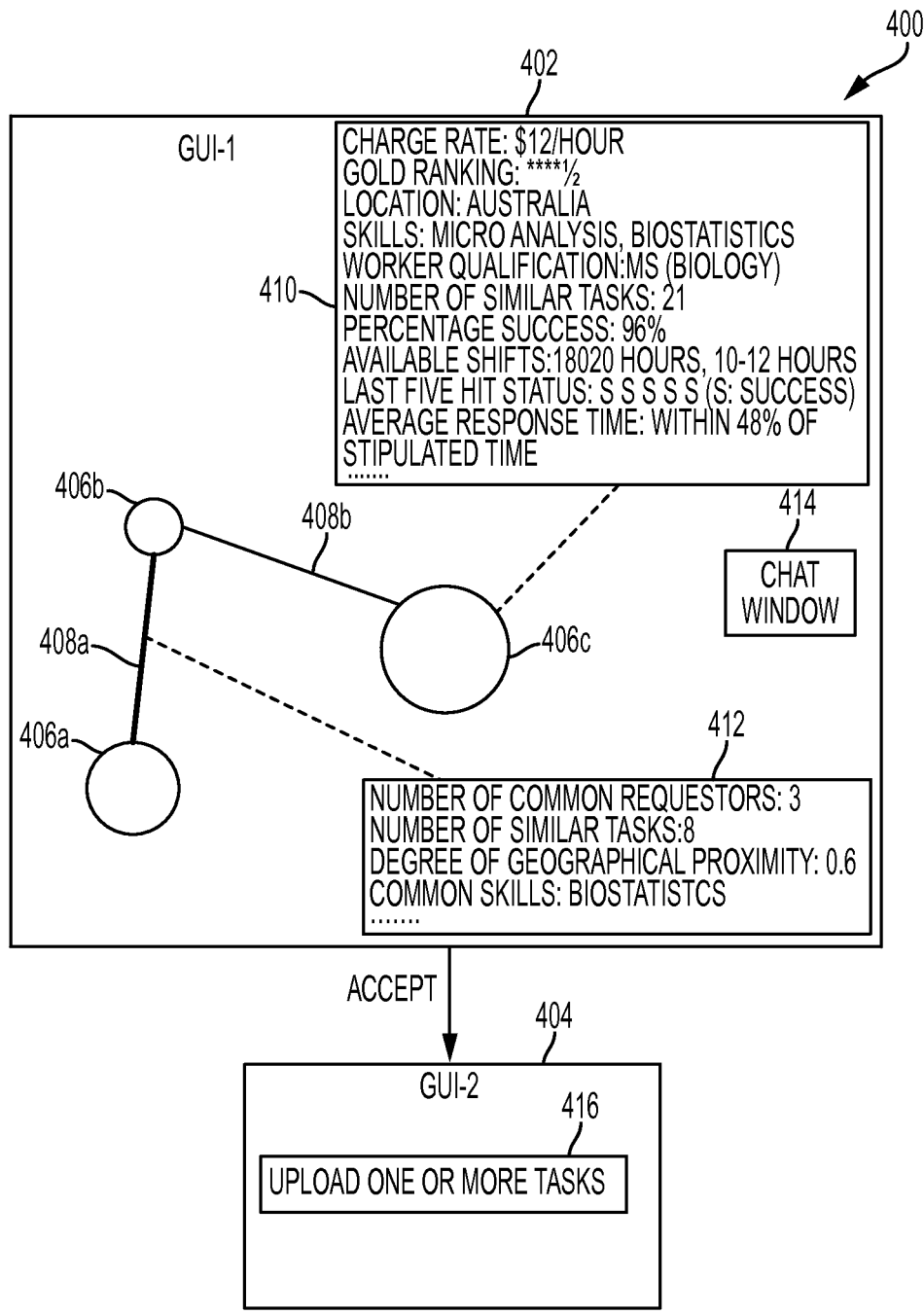
FIG. 4 is a block diagram illustrating a graphical user interface presented to a requestor, in accordance with at least one embodiment.

FIG. 4 is a block diagram illustrating a graphical user interface presented to a requestor, in accordance with at least one embodiment. The block diagram 400 has been described in conjunction with FIG. 1, FIG. 2, and FIG. 3.

A graphical user interface, GUI-1, (depicted by 402) is presented to the requestor. The GUI-1 402 includes the first graph, as discussed in the FIG. 3 that enables the requestor to provide the input. The input may correspond to the selection of second set of workers from the first set of workers. The first graph includes the one or more nodes (such as 406a, 406b, and 406c, hereinafter collectively referred as 406) and the one or more edges (such as 408a and 408b, hereinafter collectively referred as 408) connecting the one or more nodes 406. When the requestor hovers or clicks on a node (e.g., 406c) from the one or more nodes 406, a window 410 is displayed to the requestor. The window 410 displays the worker characteristics such as a charge rate, a gold ranking (e.g., a star rating of the worker ranging between 1-5 stars that may be assigned based on performance of worker on one or more previously attempted tasks), a location, or skills of the worker. Similarly, when the requestor hovers over an edge (e.g., 408a) connecting two nodes (e.g., the nodes 406a and 406b), a window 412 is displayed. The window 412 displays an information regarding respective two workers who may have previously worked together on at least one task. The GUI-1 further includes a chat window 414 that enables the requestor to directly communicate with the worker.

Based on the input received from the requestor, the one or more tasks are uploaded on the crowdsourcing platform server 102 as depicted in a graphical user interface, GUI-2 404, which may be presented to the requestor. In an embodiment, the microprocessor 202 uploads the one or more tasks on the crowdsourcing platform server 102 when the requestor presses a button 416. The one or more tasks may be presented to the selected second set of worker for execution.

Figure 5:
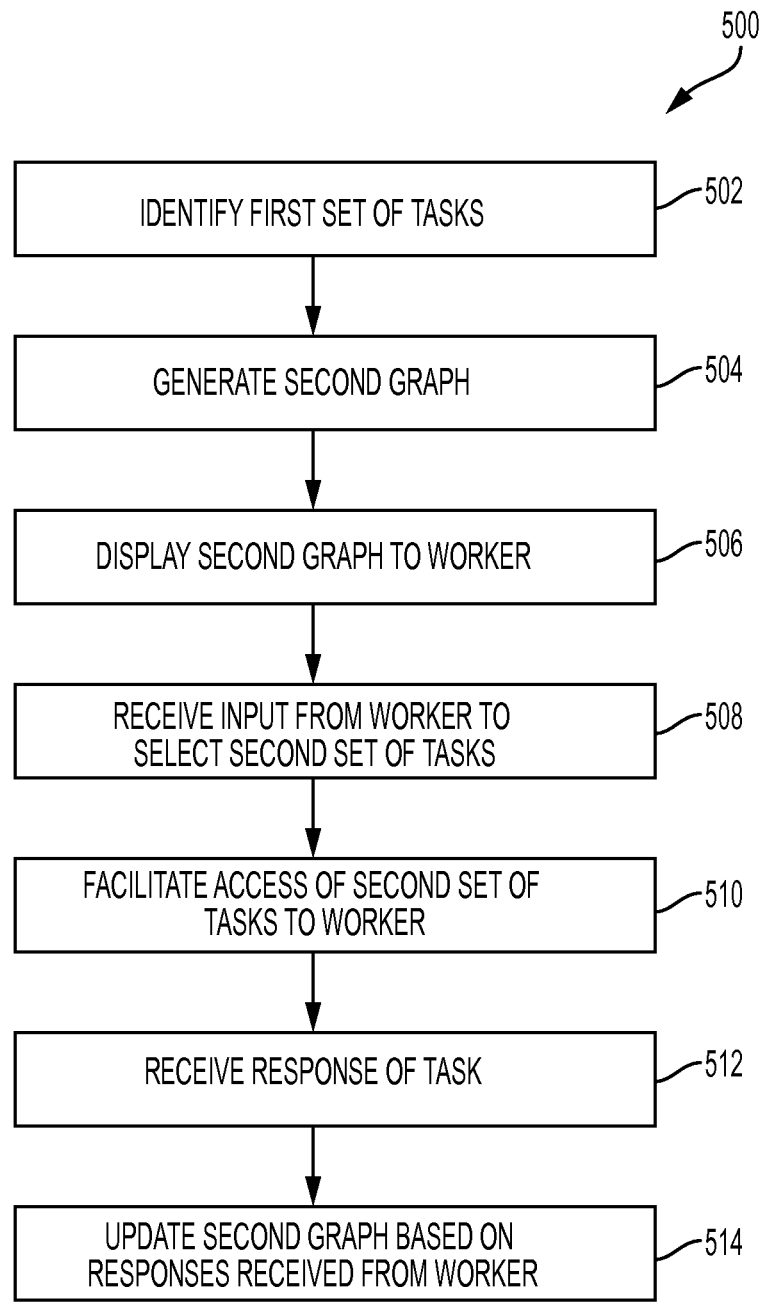
FIG. 5 is a flowchart illustrating a method for recommending tasks to a worker, in accordance with at least one embodiment.

FIG. 5 is a flowchart 500 illustrating a method for recommending one or more tasks to a worker, in accordance with at least one embodiment. The flowchart 500 has been described in conjunction with FIG. 1, FIG. 2, and FIG. 3.

At step 502, the first set of tasks are identified. In an embodiment, the microprocessor 202 may identify the first set of tasks from the one or more tasks based on one or more constraints specified by the worker. The one or more constraints may include, but are not limited to, a worker availability, a task type, a task complexity, a worker qualification, an expected remuneration, and requestor preferences. In an embodiment, the microprocessor 202 may refer to the one or more constraints stored in the database server 208 to identify the first set of tasks such that each of the first set of tasks may match the one or more constraints associated with the worker. Following Table 2 illustrates an example of values of the one or more constraints:

TABLE 2

Illustration of the constraints specified by the worker.

| Worker | Worker Availability | Worker Qualification | Remuneration (USD) | Requestor Success Rating |
|---|---|---|---|---|
| Worker_1 (W1) | Yes | MS (Biology) | 2 | 4 |
| Worker_2 (W2) | No | M. Tech | 3 | 3 |
| Worker_3 (W3) | Yes | MS (Chemistry) | 4 | 5 |

Referring to the Table 2, the Worker_1 (W1) requires 2 USD remuneration for completing the task. The qualification of the W1 is "MS (Biology)" and the W1 is available for attempting the task (posted by the requestor). On the other hand, the Worker_2 (W2) requires 3 USD remuneration for completing the task. The qualification of the W2 is "M.Tech" but the W2 is not available for attempting the task (posted by the requestor).

It will be apparent to a person having ordinary skill in the art that the above Table 2 has been provided only for illustration purposes and should not limit the scope of the disclosure. For example, the constraints specified by the worker may be different from the depicted requirements and may include more or less requirements than depicted in the Table 1.

In an embodiment, the microprocessor 202 may identify the first set of tasks based at least on a weighted sum of the task expiration time, the task type, the task complexity, the worker qualification, the expected remuneration, and the requestor preferences, corresponding to the task. In an embodiment, the microprocessor 202 may employ different ILP formulations, as discussed in the FIG. 3, to identify the first set of tasks based on the one or more constraints specified by the worker. The first set of tasks may include at least one task sent by the requestor to the worker for processing.

At step 504, the second graph is generated. The microprocessor 202 may generate the second graph. In an embodiment, prior to generating the second graph, the microprocessor 202 may retrieve data pertaining to the task characteristics from the database server 108. The task characteristics may include, but are not limited to, a task completion time, an accuracy, a remuneration associated with the task, a percentage of tasks to be completed in a predefined time, or an expected quality of task. Based on the task characteristics and the identified first set of tasks (as discussed above), the microprocessor 202 may generate the second graph. The first set of tasks may be identified based on the one or more constraints specified by the worker, as discussed in the step 502. The second graph may include one or more nodes and one or more edges connecting the one or more nodes. Each of the one or more nodes may indicate a task from the first set of tasks. Similarly, an edge from the one or more edges, connecting two tasks from the first set of tasks that may indicate one or more common characteristics corresponding to the two tasks. The one or more common characteristics may be indicative of a similarity between tasks.

In the second graph, the one or more nodes may have associated one or more first parameters. Similarly, the one or more edges may have associated one or more second parameters. The one or more first parameters may include, but are not limited to a node size and a node color. In an embodiment, the microprocessor 202 may utilize the node size in the second graph to indicate that the task may be familiar for the worker based on the one or more skills of the worker. In an embodiment, the microprocessor 202 may determine the familiarity of the task for the worker based on the number of tasks previously attempted by the worker of same type as that of the task under consideration. For example, one of the task is related to image processing and a second task is related to document digitization. If the number of image processing tasks, previously attempted by the worker, is more than the document digitization tasks, the node size of the tasks corresponding to the document processing is small in comparison to the node size of the image processing task. In this scenario, the image processing task may be determined to be more familiar for the worker than the document digitization task. Further, the node color may be utilized to indicate the remuneration offered for the task.

A person having ordinary skill in the art would understand that the scope of the disclosure is not limited to having the node size depict the familiarity of the worker with the task and having the node color depict the remuneration offered for the task. In an embodiment, the microprocessor 202 may receive an input, from the worker, indicative of at least one constraint that may be of more importance to the worker. Based on the input of the selected constraint, the microprocessor 202 may vary the node size. For example, the worker may select expiry time of task as the at least one constraint. In such a scenario, the microprocessor 202 may vary of the node size based on the expiry time of the corresponding task. For instance, if the expiry time of a task-1 is 2 hours and that of the task-2 is 4 hours, the node size representing the task-2 will be more than the node size of the node representing the task-1. Further, the scope of the disclosure should not limited to selecting only one constraint. In an embodiment, the worker may provide input to select more than one constraints. In such a scenario, the worker may further provide an input to assign a weightage to each of the selected constraints. The microprocessor 202 may determine the weighted sum of the constraints to determine the node size for each task in the first set of tasks.

In another embodiment, the microprocessor 202 may display the one or more nodes in such a manner that each of the one or more nodes may include a first portion and a second portion. The first portion may include information pertaining to the requestor associated with the task, while the second portion may include information pertaining to the task remuneration corresponding to the task. In an embodiment, the node may be represented with a spectrum of colors (i.e., from green to red). The spectrum of colors may indicate expiry time of the task. For example, in an embodiment, shades of red may signify the tasks that have a nearer expiry time, while shades of green may signify the tasks that have a further expiry time.

Similarly, the one or more second parameters associated with each of the one or more edges may include, but are not limited to, an edge thickness and an edge color. The edge thickness may indicate a degree of similarity between the tasks. In an embodiment, the degree of similarity is determined based on the common characteristics between two tasks from the first set of tasks. The graphical representation has been described later in conjunction with the FIG. 6.

At step 506, the second graph is displayed. The microprocessor 202 may display the second graph to the worker. The second graph may be displayed on the user interface associated with the worker-computing device 106. In an embodiment, the microprocessor 202 may generate the second graph, as disclosed above in the step 504.

At step 508, an input is received. In an embodiment, the microprocessor 202 may receive an input from the worker (using the worker-computing device 106) to select the second set of tasks from the first set of tasks. The microprocessor 202 may select the second set of tasks based on the input received from the worker in response to the second graph being displayed to the worker.

At step 510, the microprocessor 202 may facilitate access of the second set of tasks to the worker. In an embodiment, the microprocessor 202 may facilitate access of second set of tasks based on the input received from the worker. The input may correspond to the selection of the second set of tasks, as discussed in the step 508. Further, the microprocessor 202 may establish a communication channel between the worker and requestors of each of the second set of tasks. In an embodiment, the requestor and the worker may utilize the communication channel to negotiate the terms of the SLA. In an embodiment, the establishment of the communication channel has been described in conjunction with FIG. 3.

At step 512, a response of a task from the second set of tasks is received. The microprocessor 202 may receive the response from the worker. The response may be related to one or more outputs associated with the task performed by the worker.

At step 514, the second graph is updated. In an embodiment, the microprocessor 202 may update the second graph based on the responses received from the worker. In an embodiment, the microprocessor 202 may deem the tasks for which responses have been received as complete. Therefore, the updated second graph may not include the second set of tasks.

In an embodiment, the microprocessor 202 may update the second graph based on a detection of an event. The event may include, but is not limited to, an unavailability of the first set of workers, an expiration of the task, or one or more changes in the SLA associated with the task, as discussed above. For example, the connection between the worker-computing device 106 and the crowdsourcing platform server 102 dropped. Therefore, the application server may consider this event as an unavailability of the worker. Consequently, the microprocessor 202 may update the second graph to reflect this change. In a second scenario, where a task may be retracted by the requestor, the microprocessor 202 may update the second graph such that it would not include the task retracted by the requestor. In an embodiment, the microprocessor 202 may periodically update the second graph.

It will be apparent to a person having ordinary skill in the art that the above-mentioned events have been provided only for illustration purposes and should not limit the scope of the disclosure.

Figure 6:
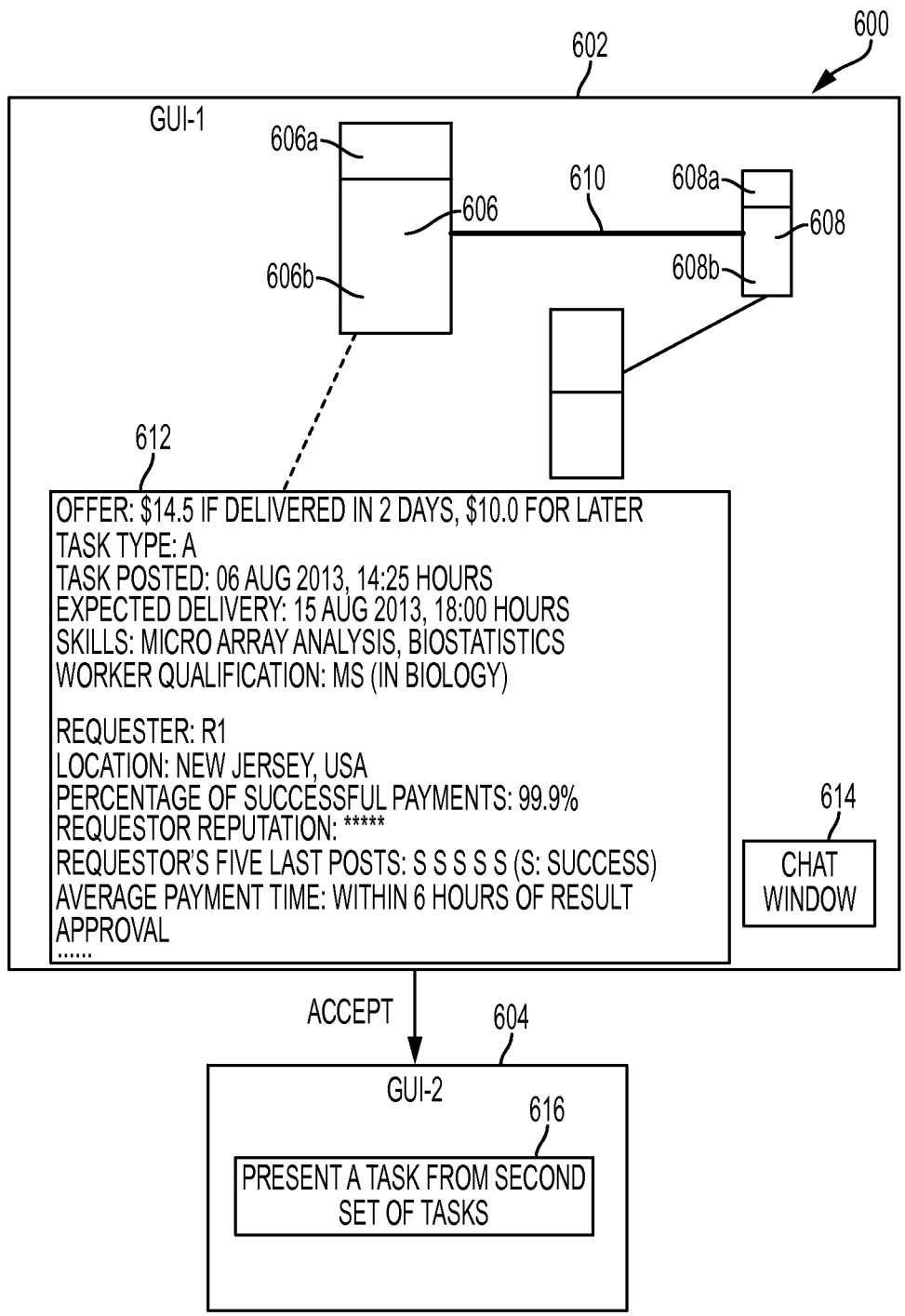
FIG. 6 is a block diagram illustrating a graphical user interface presented to a worker, in accordance with at least one embodiment.

FIG. 6 is a block diagram illustrating a graphical user interface presented to a worker, in accordance with at least one embodiment. The block diagram 600 has been described in conjunction with FIG. 1, FIG. 2, FIG. 3, and FIG. 5.

A graphical user interface, GUI-1 (depicted by 602) is presented to the worker. The GUI-1 602 includes the second graph, as discussed in the FIG. 5 that enables the worker to provide the input. The input may correspond to the selection of second set of tasks from the first set of tasks. The second graph includes the one or more nodes (depicted by 606 and 608) and the one or more edges (depicted by 610) connecting the one or more nodes (i.e., 606 and 608). Each of the one or more nodes (i.e., 606 and 608) may include the first portion (depicted by 606a) and the second portion (depicted by 606b).

When the worker hovers or clicks on the node 606, a window 612 is displayed to the worker. The window 612 displays information such as, but not limited to, an offer, a task type, a task posted, an expected delivery, one or more skills, a qualification, a requestor's location, or a requestor's reputation. Further, if the worker hovers or clicks the edge connecting two nodes, the worker is displayed common characteristics of the two tasks connected by the edge. The GUI-1 further includes a chat window 614 that enables the worker to facilitate the direct communication with the requestor.

Based on the input received from the worker, the second set of tasks are presented to the worker, as depicted in a graphical user interface, GUI-2 604. In an embodiment, the microprocessor 202 presents the second set of tasks (depicted by 616) available on the crowdsourcing platforms. The second set of tasks are presented to the worker for performance by the worker.

A person having ordinary skill in the art would understand that the scope of the disclosure is not limited to the first and the second graphs being displayed in the form of the one or more nodes and the one or more edges. In an embodiment, the graphs may correspond to a spider chart. In an embodiment, spider chart versions of the first graph and the second graph have been described in conjunction with FIG. 7 and FIG. 8, respectively.

Figure 7:
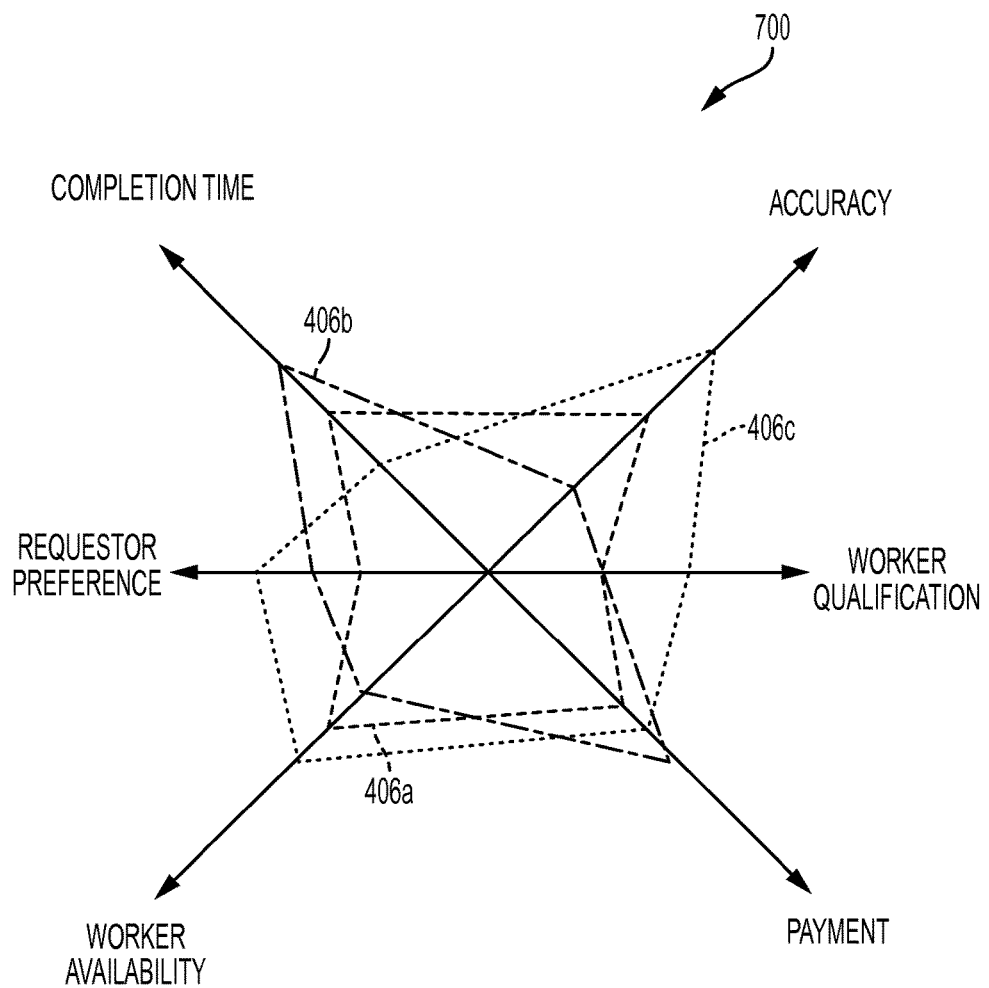
FIG. 7 is another graph illustrating the first set of workers, in accordance with at least one embodiment.

FIG. 7 is another graph 700 illustrating the first set of workers, in accordance with at least one embodiment. The graphical representation has been described in conjunction with FIG. 1, FIG. 2, and FIG. 3.

As discussed above, the microprocessor 202 may generate the first graph in the form of a spider chart (depicted as 700). The spider chart 700 may indicate a multivariate data in the form of a two-dimensional chart. The two-dimensional chart may include one or more equi-angular spokes, (i.e., radii). Each equi-angular spoke may correspond to worker characteristics associated with one or more workers (i.e., 406a, 406b, and 406c). As depicted in the FIG. 7, the worker characteristics may include, but are not limited to, a completion time, an accuracy, a worker qualification, an availability, a payment, or a requestor preference. Thereafter, a line connecting the data points for each variable may make the first graph as the spider chart 700.

For example, from the spider chart 700, it is evident that the worker 406a has more availability in comparison to the worker 406b. Further, the average completion time of worker 406b is more in comparison to the worker 406c.

In an embodiment, the spider chart 700 may include workers who may satisfy the Service Level Agreement (SLA) associated with the task and the variables (or spokes) may represent the characteristics required by the requestor for the task. Based on the spider chart 700, the requestor may choose a worker from the one or more workers (i.e., 406a, 406b, and 406c). For example, the requestor may select the worker (depicted by 406c) from the one or more workers based on the spider chart 700.

Figure 8:
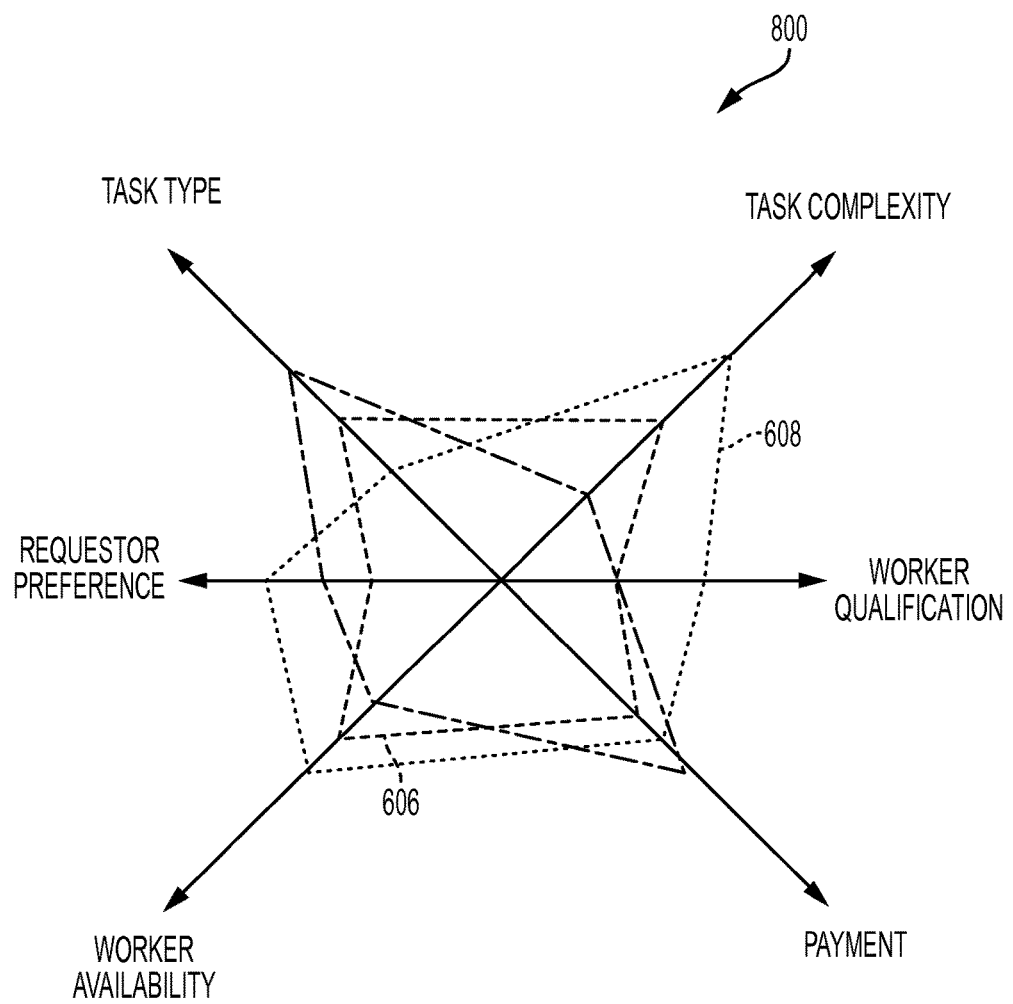
FIG. 8 is another graph illustrating the first set of tasks, in accordance with at least one embodiment.

FIG. 8 is another graph 800 illustrating the first set of tasks, in accordance with at least one embodiment. The graphical representation has been described in conjunction with FIG. 1, FIG. 2, and FIG. 5.

As discussed above, the microprocessor 202 may generate the second graph in the form of a spider chart (depicted by 800). The spider chart 800 may indicate a multivariate data in the form of a two-dimensional chart. The two-dimensional chart may include equi-angular spokes, (i.e., radii). Each equi-angular spokes may correspond to task characteristics. As depicted in the FIG. 8, the task characteristics may include, but are not limited to, a worker availability, a task complexity, a worker qualification, a remuneration, or a requestor preference. Thereafter, a line connecting the data points for each variable may make the second graph as the spider chart 800. In an embodiment, the microprocessor 202 may employ different ILP formulations to generate the spider chart 800, as disclosed above.

For example, from the spider chart 800, it is evident that the task 608 has more requestor preferences and worker availability as compared to the task 606.

In an embodiment, the spider chart 800 may include tasks and the variables (or spokes) may represent the characteristics of tasks. Based on the spider chart 800, the worker may choose a task from the one or more tasks (i.e., 606 and 608). For example, the worker may select the task (depicted by 608) from the one or more tasks based on the spider chart 800.

The disclosed embodiments encompass numerous advantages. Through various embodiments for crowdsourcing a task, it is disclosed that interactive and real time task-specific graphs may be generated to allow dynamic selection of workers. Further, the generation and dynamic updating of task-specific graphs based on the availability of workers and the worker characteristics may be performed. This kind of scenario may result in achieving turn-around-time and the SLA associated with the tasks. Further, it is disclosed that the requestors may select the workers for the task as per their task requirements. Similarly, through various embodiments for recommending a task to a worker, it is disclosed that the interactive and real time worker-specific graphs may be generated to allow dynamic selection of tasks by the workers. Further, the generation and dynamic updating of worker-specific graphs based on the specification of the workers may be allowed. This kind of scenario may motivate the workers to pull the task based on their requirements and characteristics, and to devote more time for performing the tasks through crowdsourcing. Further, it provides an option to workers either to accept or to discard the task based on their requirements.

Further, it is disclosed that it facilitates the direct communication between the requestors and the workers. This kind of scenario may allow requestors and the workers to negotiate various terms of the Service Level Agreement (SLA). For example, the requestor and the workers may negotiate the remuneration and the turn around time. Thus, through various embodiments, it is disclosed that the crowdsourcing of the tasks and recommending the tasks may be made more cost effective for both the crowdworkers, and the requesters.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for crowdsourcing tasks have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for crowdsourcing a task, the method comprising:

identifying, by one or more microprocessors, a first set of workers from one or more workers, based on a performance of said one or more workers on a set of tasks previously attempted by said one or more workers, and a Service Level Agreement (SLA) associated with said task;

generating, by said one or more microprocessors, a graph comprising one or more nodes and one or more edges connecting said one or more nodes, wherein each of said one or more nodes is indicative of a worker from said first set of workers, wherein an edge from said one or more edges, connecting two workers from said first set of workers, is indicative of said two workers having worked together on at least one task, wherein each node is associated with a plurality of first parameters and a size of each node is determined based on a weighted sum of values of the plurality of first parameters, and wherein a thickness of each edge is indicative of a degree to which the two workers have worked together;

generating, by said one or more microprocessors, a graphical user interface on a display screen to display the graph, the graphical user interface displaying the nodes in an interactive manner such that a window is displayed within the graphical user interface to present information regarding the worker, when a requestor manipulates an input device to click on the node or hover over the node;

receiving an input, by said one or more microprocessors, from a requestor, to select a second set of workers from said first set of workers, based on the plurality of first parameters associated with each node in said graph and a plurality of second parameters associated with each edge in said graph;

establishing, by said one or more microprocessors, a communication channel between the requestor and the selected second set of workers to collaborate on the task;

receiving, by said one or more microprocessors, a response to the task from the second set of workers; and updating, by said one or more microprocessors, the graph based on the response received from the second set of workers and based on a detection of an event corresponding to a non-availability of said first set of workers.

2. The method of claim 1, wherein said Service Level Agreement (SLA) associated with said task includes task completion time, an accuracy, a percentage of tasks to be completed in a predefined time, an expected quality of a task, and a remuneration offered to complete the task, and wherein said first set of workers are identified based on at least a weighted sum of said accuracy of said one or more workers, and said task completion time corresponding to said one or more workers, for said task.

3. The method of claim 1, further comprising displaying, by said one or more microprocessors, said graph, on a display screen associated with a requestor.

4. The method of claim 1, further comprising facilitating, by said one or more microprocessors, access of said task, to said second set of workers, wherein an option of accepting said task is presented to said second set of workers.

5. The method of claim 4 further comprising facilitating, by said one or more microprocessors, a direct communication between said requestor and at least one worker from said second set of workers, for negotiating terms of said Service Level Agreement (SLA) associated with said task.

6. The method of claim 1, wherein updating, by said one or more microprocessors, the graph is also based on expiration of said task, and one or more changes in said Service Level Agreement (SLA) associated with said task.

7. The method of claim 1, wherein said plurality of first parameters comprise at least one of the size of each node and node color, wherein said size of each node is indicative of at least a familiarity of said worker with said task or an average accuracy of said worker over tasks similar to said task, and wherein said node color of each node is indicative of a worker's charge rate for attempting said task.

8. The method of claim 1, wherein said plurality of second parameters comprise at least one of the thickness of each edge and edge color, wherein said edge color associated with each of said one or more edges is indicative of a likelihood of one or more workers executing one or more tasks, incident on said each of said one or more edges.

9. A system for crowdsourcing a task, the system comprising:
one or more microprocessors configured to:
identify a first set of workers from one or more workers, based on a performance of said one or more workers on a set of tasks previously attempted by said one or more workers and a Service Level Agreement (SLA) associated with said task;
generate a graph comprising one or more nodes and one or more edges connecting said one or more nodes, wherein each of said one or more nodes is indicative of a worker from said first set of workers, wherein an edge from said one or more edges, connecting two workers from said first set of workers, is indicative of said two workers having worked together on at least one task, wherein each node is associated with a plurality of first parameters and a size of each node is determined based on a weighted sum of values of the plurality of first parameters, and wherein a thickness of each edge is indicative of a degree to which the two workers have worked together;
generate a graphical user interface on a display screen to display the graph, the graphical user interface displaying the nodes in an interactive manner such that a window is displayed within the graphical user interface to present information regarding the worker, when a requestor manipulates an input device to click on the node or hover over the node;
receive an input from a requestor to select a second set of workers from said first set of workers, based on the plurality of first parameters associated with each node in said graph and a plurality of second parameters associated with each edge in said graph;
establish a communication channel between the requestor and the selected second set of workers to collaborate on the task;
receive a response to the task from the second set of workers; and
update the graph based on the response received from the second set of workers and based on a detection of an event corresponding to a non-availability of said first set of workers.

10. A computer program product for use with a computer, the computer program product comprising a non-transitory computer readable medium, wherein the non-transitory computer readable medium stores a computer program code for crowdsourcing a task, wherein the computer program code is executable by one or more microprocessors to:
identify a first set of workers from one or more workers, based on a performance of said one or more workers on a set of tasks previously attempted by said one or more workers and a Service Level Agreement (SLA) associated with said task;
generate a graph comprising one or more nodes and one or more edges connecting said one or more nodes, wherein each of said one or more nodes is indicative of a worker from said first set of workers, wherein an edge from said one or more edges, connecting two workers from said first set of workers, is indicative of said two workers having worked together on at least one task, wherein each node is associated with a plurality of first parameters and a size of each node is determined based on a weighted sum of values of the plurality of first parameters, and wherein a thickness of each edge is indicative of a degree to which the two workers have worked together;
generate a graphical user interface on a display screen to display the graph, the graphical user interface displaying the nodes in an interactive manner such that a window is displayed within the graphical user interface to present information regarding the worker, when a requestor manipulates an input device to click on the node or hover over the node; and
receive an input from a requestor to select a second set of workers from said first set of workers, based on a plurality of first parameters associated with each node in said graph and a plurality of second parameters associated with each edge in said graph;
establish a communication channel between the requestor and the selected second set of workers to collaborate on the task;
receive a response to the task from the second set of workers; and
update the graph based on the response received from the second set of workers and based on a detection of an event corresponding to a non-availability of said first set of workers.

\* \* \* \* \*